J. GOOD.
KEROSENE ENGINE.
APPLICATION FILED JUNE 6, 1916.
1,253,682.
Patented Jan. 15, 1918.
2 SHEETS—SHEET 1.
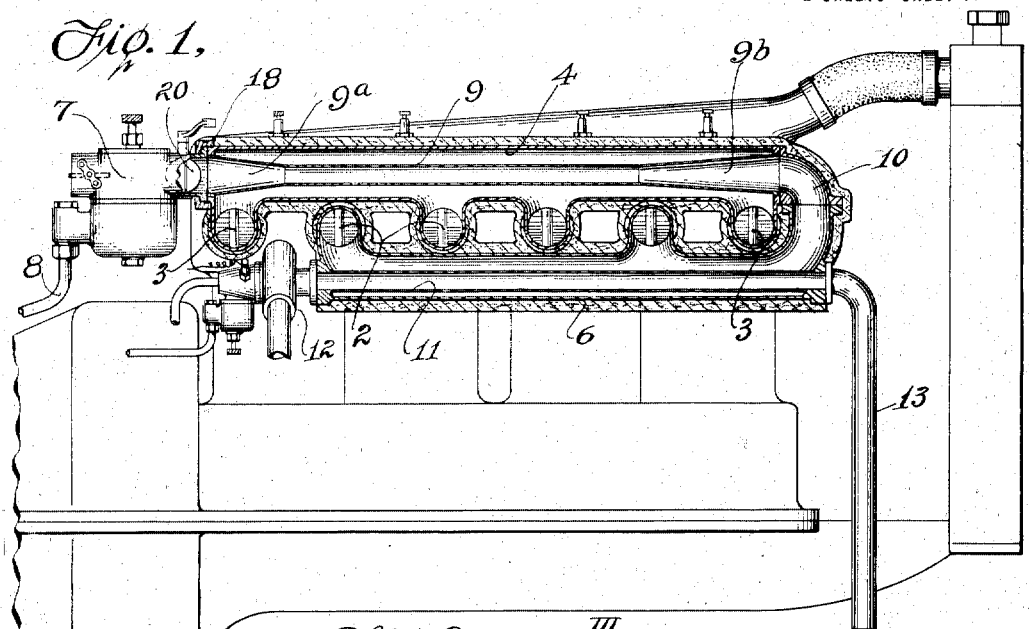
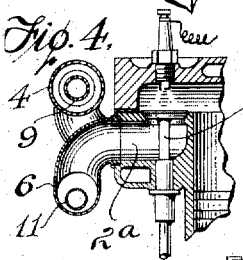
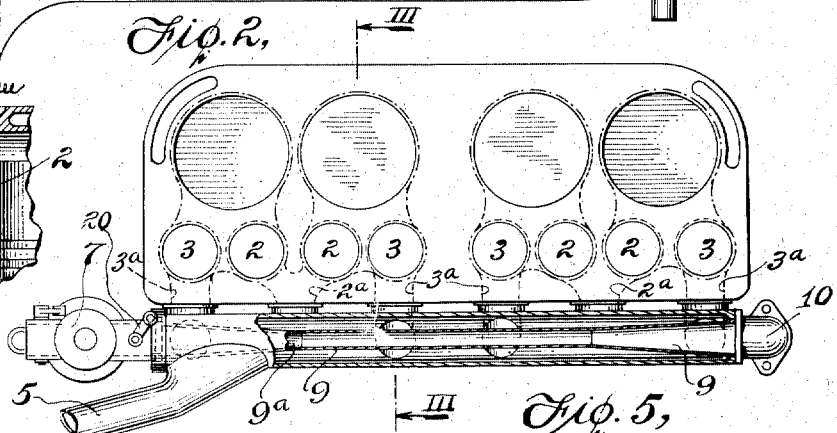
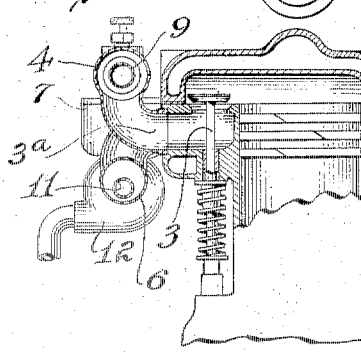

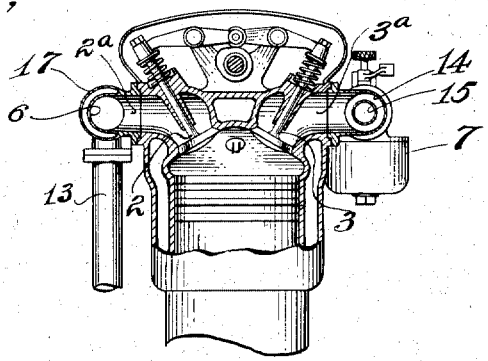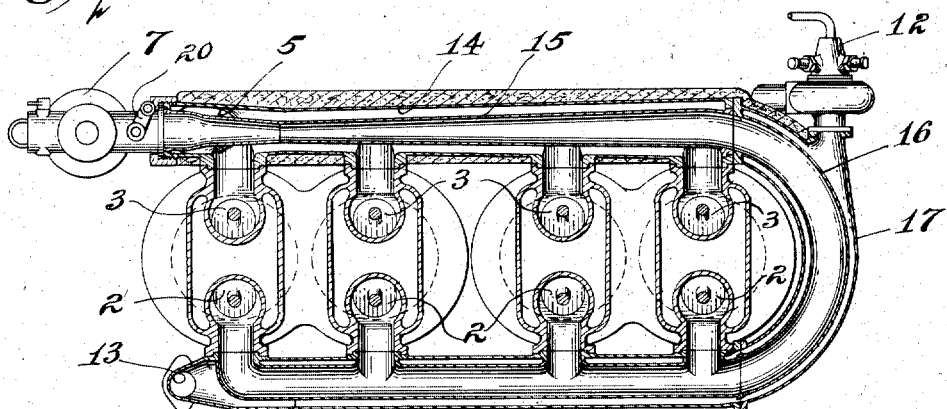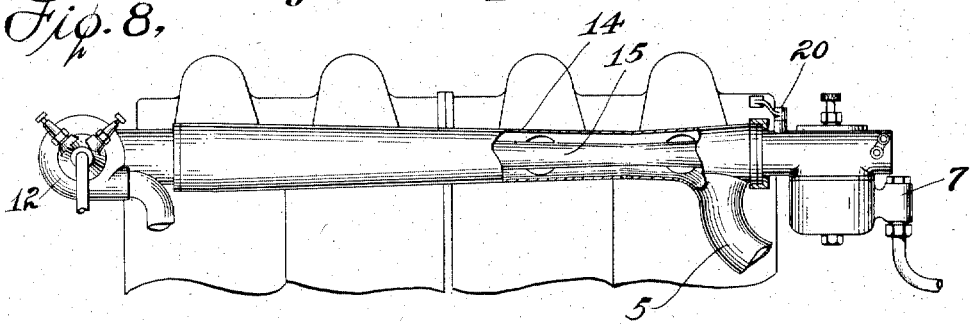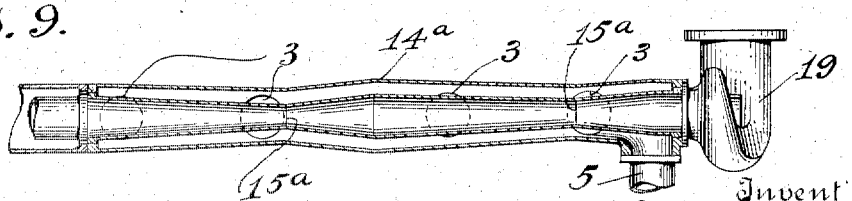

UNITED STATES PATENT OFFICE.

JOHN GOOD, OF BROOKLYN, NEW YORK, ASSIGNOR TO GOOD INVENTIONS CO., OF BROOKLYN, NEW YORK, A CORPORATION OF NEW YORK.

KEROSENE-ENGINE.

1,253,682.      Specification of Letters Patent.      Patented Jan. 15, 1918.

Application filed June 6, 1916. Serial No. 101,888.

*To all whom it may concern:*

Be it known that I, JOHN GOOD, a citizen of the United States, residing in Brooklyn, New York, have invented the following-described Improvements in Kerosene-Engines.

My invention is a kerosene-burning automobile engine having as its principal object an organization of the charge forming and heating elements in such manner as to insure clean and efficient utilization of the fuel under the ever-changing conditions of speed and load that are peculiar to automobile operation, and the further object of accomplishing this result without appreciable contamination of the lubricating oil in the crank case with the kerosene, and without the use of a more volatile fuel for starting, and by means of apparatus of such small compass as to be readily incorporated in automobile power plants without departure from standard principles of design or change in the vehicle.

Kerosene-burning engines have been heretofore produced and are well known, but are not adapted, and have not thus far been successfully used for automobile propulsion, for reasons which are attributable in general to the fouling of the interior parts and which result from the lack of uniformity of load and speed and the intermittence of service in automobile engines. Existing types of kerosene engines using pre-formed charge mixtures of oil and air, are satisfactory, only in so far as the load and the general operative conditions are confined to variation within relatively narrow limits, that is to say for such uses as marine propulsion or stationary power plants, or where the operator can manually control the functions as circumstances may require. Automobile engines however are subject to constantly changing conditions and throughout extremely wide ranges, and to intermittent service and are rarely run at constant speed or constant load for any considerable period and are furthermore notoriously maltreated by their operators.

The problem which my invention has solved is thus particularly concerned with the accommodation of the vaporization in the charge-forming apparatus to the variations of engine operation so as to maintain automatically a constant effect or condition of charge, and which, as above stated has not to my knowledge been heretofore accomplished.

Concluding from the results of several years' systematic experiment, I have ascertained that while complete vaporization of the fuel and hence an absolutely dry gaseous mixture is ideal for even distribution to the cylinders and cleanliness of operation in automobile engines, it is not ordinarily easily obtained with kerosene nor continuously maintained except at entering temperatures so high as to entail counter-acting objections, and I have further discovered that highly satisfactory and cleanly operation is not entirely dependent upon complete vaporization and that a small percentage of the fuel in liquid form is permissible in the charge provided the temperature variation of the latter is confined to a small range of say 25° F. at the inlet header and I have developed the apparatus hereinafter described with particular reference to this limitation, as well as to the collateral requirements that the temperature of the entering charge shall instantly and automatically become accommodated to the variations in the weight of the charge mixture so that a small charge entering on a suddenly restricted throttle adjustment may not become excessively heated, or vice versa, that an enlarged charge from a suddenly opened throttle may not receive an insufficient amount of heat, in other words, that the temperature accommodation shall be instantaneous or at least as quick as the quickest ordinary change in throttle adjustment. The solution of the problem however depends not merely on the maintenance of the said minimum temperature variation, but likewise involves the important consideration that for all conditions of engine operation the vaporization shall take place with substantial uniformity in result, so that the mixture entering the cylinders will either be absolutely dry or not so wet with liquid kerosene (in the form of suspended particles or films on the walls of the passages) as to give rise to the objection commonly accruing from too wet mixtures. This in effect means that the mixture requires to be vaporized to nearly the point of complete dryness, the amount of liquid contained in it being so small as to be just visible when the parts are made of glass and such nearly complete vaporization or complete vaporization, the latter being always preferred, must be accomplished without any of the attendant disadvantages that are peculiar to fuels of the complexity of kerosene, that is to say, the breaking down in the vaporizing chamber and formation of tarry or carbon deposits therein which, by accumulating, prevent the prompt exchange of heat between the mixture and the heating medium employed.

The heat for vaporizing the fuel is derived from the discharging gases of the internal combustion, as in the case of all engines of this class, but in the present invention, is so utilized in relation to the vaporizing mixture that it is transferred to the mixture in a manner which is specially effective to maintain the substantially constant temperature effect above referred to and without the need of thermostatic control or bypasses. The desired and necessary temperature condition is thus maintained automatically and quite regardless of the throttle adjustment or the suddenness or frequency of throttle changes and likewise independently of the load on the engine.

The present invention thus attains the said constancy of inlet temperature by the mutual coördination of several factors having to do with the condition of the entering charge under changing conditions of engine operation.

In the accompanying drawings, I have shown my invention applied to a four cylinder engine, known as the Ford automobile engine, and with sufficient details of structure to enable engine builders to construct and use the same. Referring to these drawings, Figure 1 represents the engine in outline and the exhaust and inlet headers in vertical longitudinal section, thus exposing the exhaust and inlet ports of the engine and also the valve stems which appear through the latter. The figure shows also the charge proportioning device or so-called carbureter and the burner-head of the heater in their relative positions.

Fig. 2 is a top plan of the engine with the head removed and the exhaust header and vaporizing tube partly in section.

Fig. 3 is a partial cross-section of Fig. 2 on line III—III, being in the vertical plane of one of the exhaust ports.

Fig. 4 is a similar section of the inlet port.

Fig. 5 is a horizontal section of the exhaust header showing a modified form of vaporizer tube.

Fig. 6 is a cross section through a different type of engine showing an alternate and in some respects superior relation of vaporizing tube and engine.

Fig. 7 is a longitudinal horizontal section illustrating the relation of the vaporizing tube and the heating apparatus or burner.

Fig. 8 illustrates the reverse side of the engine shown in Fig. 7, and

Fig. 9 a further modification of vaporizer tube.

Fig. 10 being a further modification.

In the L-type four cylinder engine shown in Fig. 1–4 each cylinder, 1, is controlled by an inlet valve 2 and an exhaust valve 3 both of the puppet type, and appropriately operated by means not appearing in the drawing. The exhaust valves 3 in this engine control individual passages $3^a$ from each cylinder, leading directly and slightly upward into the exhaust header 4, which is a horizontal pipe or elongated chamber extending lengthwise of the engine so as to be close to the exhaust valve of each cylinder. This header is connected to an off-take 5 leading to the muffler or elsewhere. The inlet valve ports of each pair of adjacent cylinders are supplied with charge mixture through a single entrance port, marked $2^a$, from a longitudinal inlet header 6 disposed parallel with and just below the exhaust header 4. There are thus in this particular engine four exhaust ports directed into the exhaust header and two inlet ports connected with the inlet header and both headers, as noted, are close together. They are preferably covered with a lagging of heat-insulating material which covers also the intervening connections between them as indicated in Fig. 1, but for clearness omitted from the other figures.

The charge-proportioning device 7 which may be of any of the types suited for gasolene and commonly used on automobile engines, is mounted at the end of the exhaust header 4 and supplied with kerosene oil or such other similar fuel as may be employed, through a connecting pipe 8. The function of this device is to establish and maintain correct combustible proportions of the mixture of liquid fuel and air, the fuel being preferably in the form of a spray more or less impregnating the air. This mixture is drawn by the inspirating action of the engine from the proportioner 7 through a vaporizing tube 9 centrally located within the exhaust header and supported by its ends therein in such manner that upon removal of the device 7 from the ends of the header 4 it may be withdrawn from the latter, being thus removable. The characteristics of this tube, representing the vaporizer proper of this invention are important and will be referred to below. From the end of the vaporizing tube 9 the mixture is drawn through the insulated elbow connection 10 into the inlet header 6 whence it enters the cylinders through the inlet ports $2^a$ above described.

The interior tube 11 extending lengthwise through the inlet header 6 represents a source of heat used to heat and vaporize the charge mixture when the engine is cold, sufficiently for starting. In the present case this tube is connected to a burner head 12 which projects an intense flame through it, discharging its combustion products through the outlet pipe 13 below the engine or outside of the engine compartment. This heating apparatus is shown and claimed in my prior application, Serial No. 822813 and need not be here described further than to say that it is supplied with kerosene as fuel from the main engine supply and with air under pressure and that when operated it instantly produces and maintains a continuous forced combustion entirely confined within the narrow tube 11 which, as just stated, is inside of the inlet header 6 where the heat from it is most effectively conserved to the purpose intended. Although other heating apparatus might be used for initial vaporization, this one is preferred because it ignites by electric spark and can be started in action very readily by simply turning on a source of compressed air, or by simple mechanical motion as full described in the application referred to. The location of such a heating tube inside of the inlet header so that it is surrounded on all sides by the mixture to be heated and vaporized, I consider of itself an improvement in starting apparatus independent of the other and broader matters described herein, the advantages of such internal arrangement of heater being apparent without further explanation.

Referring now to the type of engine shown in Figs. 6, 7, and 8, it will be observed that the valves, 2 and 3 controlling inlet and exhaust, are here of the overhead type and that by such arrangement the exhaust gas has access to the vaporizing tube in a substantially straight and very short path and with the least contact with water-cooled walls likely to dissipate its heat. The said tube is centralized within the exhaust header 14 and the latter is very close to the combustion space and, as in the preceding figures, lies alongside the row of exhaust ports, lengthwise of the engine, extending substantially its full length. The charge mixture from the proportioning device 7 is drawn through the vaporizing tube 15 and through its continuation pipe 16 which leads around the engine to the inlet ports on the opposite side, the flow of vaporized mixture therein being protected from the influences of the external temperature by the insulating effect of the gas space between the pipe 16 and a surrounding pipe 17, which might be regarded as part of the exhaust header or exhaust pipe, but which is here utilized as the flame passage for the heating apparatus used for starting. Heat insulating lagging is applied to the exhaust header and may also be applied to the pipe 17. The burner head 12 of the heating apparatus in this form, is connected to pipe 17 at the bend therein, so as to project its flame through the annular space around the inlet pipes 6 and 16, both of which are thin walled, exhausting through the pipe 13 as indicated. The off-take from the exhaust header is marked 5 as before, being near the narrow part of the vaporizer tube 15. It will be understood that in both forms of engine above described the burner 12 is first set in action to heat the intake passage sufficiently to vaporize the first few charges entering the cylinder, after which the normal vaporization is accomplished by the heat of the exhaust gases impinging upon the vaporizing tube.

In both described forms and in any form of engine involving my invention, the vaporizing tube at some point or part of its length is of considerably less cross-sectional area than the rest of the passage constituting the suction intake, and this reduction of area is for the purpose of establishing a relatively high velocity of mixture flow, local to the region where vaporization takes place and takes advantage of the so-called mass-flow law, now well established though of recent origin in connection with steam generation and film heaters. According to this law, whenever the controlling resistance to the transfer of heat lies on the gas side of the wall, the heat that will pass to or be taken up by the gas is directly proportional to the weight of gas passing per minute, that is to say, in the present case it is proportional to the velocity of the mixture. Under appropriate collateral conditions presently referred to, a high rate of heat absorption is obtained in the present case, by this high local velocity and which is an important factor in securing constancy of inlet temperature, but in order to avoid excessive drop in pressure by reason of the narrowness of the passage, the tube is preferably designed according to the principles of a Venturi-tube, that is to say, it is provided with a convergent entrance section and a gradually divergent outlet or recovery section, the intervening section being the point or portion of narrowest area and constituting the throat of the Venturi-tube. By such design a maximum local velocity is attained with an inconsiderable over-all loss of pressure, that is to say with a minimum obstruction of flow to the engine. The Venturi form, moreover provides the further advantage of a very considerable reduction of pressure at its throat, local to that point, and which is highly conducive to prompt vaporization, especially when and as supplemented by the pressure reduction from a throttle restriction in advance of the throat,—the preferred location of the throttle and the external heat. In certain other respects also, vaporizing tubes of Venturi-form are particularly adapted for vaporizing kerosene and like fuels, as I have found, but which need not be here explained, further than to say that it is essential that all of the air constituent of the charge shall pass with all the liquid fuel through a single Venturi-form vaporizer. Several vaporizer tubes may if desired be arranged in tandem or series relation as presently explained but if several such tubes be arranged abreast or in multiple relation, the mixture will not pass through them evenly except by special provisions to that end, and will not be heated evenly or properly and neither vaporization or combustion will be clean.

In Fig. 1, the vaporizer tube consists of an entrance section $9^a$, a long throat of restricted but constant diameter and a gradually divergent recovery portion $9^b$. In the form of Fig. 5 the tube is constituted of equal entrance and recovery sections the throat being the junction between them. In Figs. 6 to 8 the entrance section is relatively short and the recovery very gradual. In Fig. 9 two Venturi-tubes $15^a$, like tube 15 of Figs. 6 to 8 but of short length, are joined end to end and constitute the vaporizing tube, and the mixture is introduced therein through a vortex elbow 19 to give it a whirling motion at the entrance. I have ascertained that the most efficient vaporization is accomplished when the liquid forms a film on the wall of the tube and the air or the remaining gaseous medium sweeps over it. In the forms of Figs. 1 to 8 the throttle 20 serves in some considerable measure to throw the liquid particles against the wall of the vaporizer tube. In Fig. 9 the whirling motion serves the same effect in a greater degree.

The passages through the vaporizer tubes, of whatever shape, should be as frictionless as possible and devoid of any pockets or abrupt bends or corners, and also devoid of any projections or baffles of any kind. Projections not only increase the resistance and over-all pressure loss but give rise to eddy-currents, and pockets or corners serve to collect pools or spots of liquid, and both result in the deposit of products of distillation on the inner walls of the vaporizer which deposit promptly interferes with and obstructs the intended function. It is of very great importance that the vaporizer tube or chamber be swept clean by the mixture itself, and the maintenance of bright surfaces inside the tube is a condition of the maintenance of a substantially non-varying inlet temperature. To provide against the contingency, likely to occur from misuse, of accidental fouling of the vaporizer tube,—on its interior, by improper proportions, or on its exterior from too much cylinder oil in the exhaust,—the tube is made removable as above recited. Loosening of the ring nut 18 disconnects the proportioner 7 and permits withdrawal of the tube, which is then easily cleaned.

While high local velocity tends to promote the rate of heat transmission, as above stated, it will not necessarily do so, nor will the final inlet temperature be constant unless, according to the mass-flow law above referred to, the controlling resistance to the exchange of heat be on the "gas" or mixture side of the heater wall, that is to say within the vaporizer tube. Should it be on the other or exhaust side, then the rate of heat transmission will depend on the rate with which the tube metal can get the heat, and this also follows the mass-flow law and would give no preference to the interior gas if it were not for one element of exception. The excepted element is the radiant exhaust gas heat which enters the tube at a rate so much higher as to tend to keep the maximum thermal resistance always on the mixture side. I therefore locate the vaporizer tube directly in line with the exhaust valve discharge from each cylinder and as close as physically possible to the exhaust valves themselves (consistent with the cylinder and valve design) where the said tube is thus subject to the effect of the radiant heat available at that point. It is well known that visible flame especially the red or yellow flame rather than the blue, has a very considerable heat-radiating power and that radiant heat will pass from such a glowing source through intervening gases into metal walls practically without resistance and at rates enormously higher than it can pass from a hot gas current through the same walls to a cooler gas current. In Fig. 3 and because of the type of engine selected, it happens that the vaporizer tube and exhaust header are elevated somewhat above the level of the exhaust ports this being in order to accommodate the inlet header, but it will be apparent that the vaporizer tube 9 is well within the range of the luminous flame from the combustion space and also that it is subject to direct impingement by the flame striking it with high velocity and before the flame has encountered any relatively cooler surface and before it has been subject to any appreciable expansion. Proximity to the luminous flame and direct, right-angled, and high velocity impingement on the tube are conditions giving rise to the greatest degree of constancy of the inlet temperature because they insure that the maximum resistance to the heat flow shall be within the tube and hence proportional to the weight flow per minute. which of course means constancy of final temperature. In the engine of Figs. 6 to 8 the valve design permits a more direct outflow of the luminous flame against the vaporizing tube and according to statements just made, makes possible a constancy of temperature at the inlet header well inside of the range of 25° above referred to. Other designs of engines could be selected giving an equal or superior radiant heat effect. In order to conform to the conditions best suited for constancy of inlet temperature and dryness of mixture in a multi-cylinder kerosene engine the vaporizing tube is horizontally disposed alongside of the cylinder heads, centralized within the header, and of a length corresponding to the length of the exhaust header, as shown in the drawings. Such length provides a sufficient vaporizing surface to produce dry-mixtures, or in any event nearly dry-mixtures, although in a general way the surface may be increased or diminished within reasonable limits. The closer the proximity to the source of the luminous flame the less surface is required and conversely the more remote from such flame, the more surface is required, but an unduly extended tube becomes dirty by decomposition.

As a means of further promoting the constancy of mixture temperature at the inlet the exhaust gases are caused to move over the vaporizer tube after impingement thereon with the maximum possible velocity which is promoted by keeping the size of the exhaust passage along the outside of the vaporizer wall as small as consistent with nondevelopment of excessive back pressure. By making the heater the restricted exhaust passage instead of the muffler the vaporizer will itself act as a muffler and produce the desired heat transmission with no more back-pressure than is now normal. As shown in Figs. 7-9 the exhaust passage surrounding the vaporizer tube is made to conform more or less to the shape of that Venturi-tube for the purpose of maintaining high velocity, especially at the throat and thereby facilitating the heat transfer.

Vaporizer tubes according to this invention and related to the other engine parts as above described, are made with very thin walls and of circular cross-section and for best results should be as thin as possible consistent with the pressure they may be called upon to withstand. For this reason the tube is made of steel although other metals will suffice, and steel tubes having walls not thicker than $\frac{1}{16}$ or $\frac{3}{32}$ of an inch and also aluminum have given very excellent results.

The thinness of the tube wall directly coöperates with the other factors making for constant inlet temperature and reduces to a negligible minimum any lag in the transfer of heat from the exhaust gas to the mixture and particularly avoids delay in reaching the normal vaporizing temperature when starting up cold. Delay under this condition involves the production of much smoke from wetness inside the vaporizer tube and the exhaust is likely to deposit carbon on the outside of the tube and thereby interfere with the subsequent heat exchange. The thinness of the vaporizer wall is also important in respect to the vaporization of the liquid without breaking it down having a very noticeable effect irrespective of other conditions in producing a charge mixture which is substantially dry and non-fouling.

For using commercial grades of kerosene the engine compression may be 45 or 50 pounds or even higher, when equipped with apparatus above described and without the use of water injection. Such an engine will preserve a substantially constant inlet temperature throughout extreme variations of running (automobile) conditions and with proper timing of the spark, temperature variation may be kept within ten degrees even including idling and it ordinarily runs at an inlet temperature of about 235° F. The same apparatus suffices also for other high speed engines and for other or heavier grades of fuel but the tube is preferably made longer for the heavier fuels in order to increase the vaporizing surface accordingly. Multiplication of the number of cylinders tends to decrease the temperature variation and preheating of the air constituent of the charge tends to promote the vaporization and can be used with advantage for fuels heavier than kerosene, by using for example, the air-heating system described in my prior application Serial No. 92,816, filed April 22, 1916, and the use of which is advisable in preference to an extension of the length of the vaporizing tube beyond the general dimensions shown, to avoid breaking down of the fuel within the tube. The burner device 12 may and preferably should be run until the internal combustion is well established. The application of the starting heat to the suction intake at a point in its length near to the inlet valves but separate from the normal vaporizer, will be observed to be accompanied by the least complication of the vaporizer itself. I have found that for large sizes of engines it is preferable to multiply the number of charge-forming devices and vaporizer tubes rather than increase the general size of a single equipment and which may be done in simple manner by employing a plurality of fuel nozzles in the proportioning device, each creating the charge mixture for one vaporizer tube and all of the latter being contained within the exhaust header as herein described. Fig. 10 illustrates such a construction as just referred to, 7ª being the fuel nozzle, 20 the throttle and 21 the air check which in this case is between the throttle and the fuel nozzle. The top of the float chamber is shown as balanced to the space between the throttle and the air check by means of the pipe 22.

It will be observed that my invention thus consists in the coöperative mutual relation of the several features above described as well as in certain features independently, and that it is characterized by the maintenance of substantially constant inlet temperature, uniform distribution to the cylinders and clean internal combustion and vaporization, and is therefore represented by the combination of said features and sub-combinations thereof, as set forth in the claims, and it will be understood that within the limits herein stated, various modifications, alterations, omissions, reversals and other changes may be comprehended without departing from the invention.

I claim:

1. Fuel charge supply means for internal combustion engines comprising a suction intake formed in part of a thin-walled tube devoid of internal deposit-forming pockets or projections and exterior heat-retaining appendages and equal in length to at least several cylinder diameters and of reduced cross-sectional area for such length, as compared to the rest of the intake passage, and disposed in the engine's exhaust gas passage close to the region of combustion, and a fuel and air proportioner delivering its whole charge mixture into said tube in the proportions intended for combustion in the engine, the said organization being adapted for supplying a non-fouling mixture of air and kerosene or like fuel throughout varying load and throttle conditions of the engine.

2. Fuel supply means for combustion engines comprising a suction intake formed in part of a single Venturi tube equal at least in length to several cylinder diameters and mounted in the engine exhaust gas passage close to the region of combustion, and a fuel and air proportioner delivering its whole charge into said Venturi tube in the proportions intended for combustion in the engine.

3. In fuel supply means for combustion engines, the combination of a suction intake formed in part of a Venturi-form vaporizer tube equal at least in length to several cylinder diameters, having its wall not more than ₃⁄₁₆ inch thick, smooth externally and internally, devoid of pockets or short turns, adapted to maintain a locally high flow velocity through it, and disposed in the engine exhaust gas passage close to the region of combustion, and a fuel and air proportioner delivering a charge mixture into said tube.

4. Fuel charge supply means for combustion engines comprising in combination with the exhaust manifold or header serving a plurality of engine cylinders, of a suction intake constituted in part by a Venturi-form vaporizing tube disposed within, substantially parallel to and coextensive with said exhaust manifold, means for introducing a fuel charge mixture into said Venturi tube, and means for conducting said mixture therefrom to the inlet ports of the engine.

5. In an engine using kerosene and like fuels, the combination with a plurality of engine cylinders and a transversely disposed exhaust header serving the same, of a suction intake constituted in part by a thin-walled Venturi-form vaporizer tube substantially equal in length to the length of said exhaust header and subject therein to the radiant heat of, and direct impingement by, the flames in said cylinders and a fuel and air proportioning device delivering a charge mixture to said intake in proportions intended for combustion in the engine.

6. Fuel vaporizing means for internal combustion engines comprising the combination with the exhaust gas header transversely disposed on a plurality of engine cylinders, of a suction intake including an intake manifold, an intake passage connected to said manifold and longitudinally traversing said exhaust header, the part of said passage subjected to the heat in said header being comprised of a thin-walled tube of less diameter than the external portions of said intake passage and a heat-insulated elbow connection forming the external connection between said tube and the said intake manifold.

7. In an engine adapted to burn kerosene and like fuels, the combination of a proportioning device adapted to deliver a charge mixture in the normal proportions suited for engine combustion under varying loads and connected to the suction intake of the engine, the said intake having a section of its length formed of cross-sectional area reduced to such extent, relatively to the rest of the length thereof, as to prevent the lingering of liquid fuel therein at any load, and receiving and conducting the whole of said mixture, a throttle between said device and the section of reduced area, and an engine exhaust passage surrounding the said reduced section.

8. In an engine adapted to burn kerosene and like fuel, the combination of the suction intake thereof connected to a charge mixture proportioning device and constituted in part by a relatively long thin-walled section of less cross-sectional area than the rest of the intake, said section being subject to the direct and substantially right-angled impingement by the luminous flame from the engine, whereby the controlling resistance to the exchange of heat is on the mixture side of the wall of said tube as hereinbefore set forth.

9. In an engine adapted to burn kerosene and like fuels, a suction intake therefor having a portion of its length formed as a thin-walled, Venturi-form vaporizer tube subject to flame impingement at successive points along the length thereof and a charge-mixture forming device connected to the entrance thereof and delivering its mixture therethrough to the engine.

10. In an engine adapted to burn kerosene and like fuels, a suction intake having a portion of its length formed as a Venturi-form vaporizer tube, subject to flame impingement at successive points along the length thereof, a charge proportioner delivering charge mixture to the entrance of said tube and a heat-insulated passage conducting said mixture from the tube to the engine.

11. In a multi-cylinder engine of the kind described, the combination of the exhaust header and a suction intake longitudinally traversing the same, the portion of the intake within the header being constituted by a Venturi tube parallel with said header, the entrance and recovery ends of said tube being equal in size to the external portions of the intake and the throat of said tube being in the path of the exhaust from two or more of the engine exhaust ports.

12. In an engine of the kind described, a suction intake for the engine divided into two longitudinal sections, one section being constituted by a vaporizer tube inclosed in the exhaust passage of the engine in combination with means independent of the engine combustion and associated with the other section for heating it.

13. In an engine of the kind described, the combination of a suction intake comprising one longitudinal section in the form of a vaporizer tube having reduced cross-sectional area and subjected to the exhaust heat of the engine close to the combustion therein, and another longitudinal section adapted to be subjected to an independent source of heat.

14. In a combustion engine having an exhaust header and an intake manifold, the combination with a suction intake formed in part of a Venturi-form vaporizer tube substantially equal in length to the said intake manifold and contained in the said exhaust header, close to the region of combustion and a charge mixture proportioner delivering its entire charge mixture into said tube.

15. In a multi-cylinder engine of the kind described, an exhaust header common to a number of cylinders, a suction intake traversing the same longitudinally and the part of said intake within the header being constituted by a Venturi tube having its entrance and recovery ends equal to the cross-sectional area of the intake and subject to individual impingement by the flames from the several exhaust ports and a charge proportioner delivering the entire charge mixture for the engine into said Venturi tube.

16. In a multi-cylinder engine the combination of a suction intake and an exhaust manifold common to a number of cylinders, a portion of the length of said intake being contained within the exhaust manifold and the portion exterior of said manifold being contained within a closed casing and means adapted to project a flame through said casing for preheating the suction intake.

17. In an engine for burning kerosene and like fuel, the combination with a charge-forming device, and a suction intake connecting the same to the engine, a portion of said intake adjacent said device being constituted of a vaporizer tube and subject to the exhaust heat of the engine, of means applied to the portion of the intake between said vaporizer and the inlet to the engine for preliminarily heating and vaporizing the charge mixture therein to start the engine when cold.

18. In an engine for burning kerosene and like fuel, the combination of a charge forming device, a Venturi-form vaporizer tube conducting the mixture therefrom and subject to the engine's exhaust heat, a pipe or passage to conduct said mixture to the combustion space of the engine, a casing surrounding said pipe and independent means for projecting flame into said casing close to the engine's normal combustion space, to start the engine when cold.

19. In an engine of the class referred to, the combination with the suction intake of the engine, a vaporizer tube forming part thereof and normally heated by the exhaust gases, of independently operated means permanently applied to the engine for heating a different part of said intake when starting the engine in operation.

20. In an engine of the class described, the combination of a suction intake formed in part by a Venturi-form vaporizer tube and an engine exhaust manifold conforming in shape to said Venturi tube and surrounding the same.

21. In an engine of the kind described, a thin-walled, Venturi tube vaporizer devoid of deposit-forming pockets or projections on its interior surface, a charge proportioning device delivering its entire charge mixture into said tube and means whereby said tube is externally subjected to flame impingement.

22. In an engine of the kind described, the combination of a suction intake connected with a liquid and air proportioning device, a portion of said intake being constituted of a Venturi-form vaporizer tube and inclosed in the exhaust gas passage of the engine and means for directing the fuel liquid entering said tube upon the convergent wall surface of said Venturi tube.

23. In an engine of the kind described, the combination of a mixture proportioning device, a Venturi tube receiving the mixture proportioned thereby, an exhaust header surrounding such tube and an intake manifold connected to said tube, the organization of said tube with respect to its length, the thinness of its walls and its proximity to the exhaust port of the engine being adapted to maintain a mixture temperature at the inlet ports automatically constant within 25° F. for all load conditions of operation.

24. In a multi-cylinder engine of the class described, the combination with the exhaust header, of a Venturi tube extending lengthwise thereof and forming part of the suction intake of the engine and adapted to conduct the charge mixture in combustible proportions to the engine, said tube having a throat portion of less cross-sectional area than the rest of the suction intake, and means in advance of said tube for directing liquid particles in the mixture against the wall of said tube.

25. In an engine of the class described, means for proportioning the charge mixture and means for vaporizing said mixture, comprising a long thin-walled Venturi tube disposed in the engine exhaust passage, and a throttle between the tube and proportioning means.

26. In a multi-cylinder engine, the combination of an exhaust header or manifold serving several cylinders, a Venturi tube inclosed by said header and means for passing the charge mixture for the engine in combustible proportions, through said tube and header to the intake ports of the engine.

27. In a multi-cylinder engine, the combination with the suction intake thereof having a section of its length constituted by a Venturi tube disposed alongside of and coextensive with the row of exhaust ports of the engine and subject to impingement by the flames therefrom.

In testimony whereof, I have signed this specification.

JOHN GOOD.